United States Patent
Cortes et al.

(10) Patent No.: US 8,234,692 B2
(45) Date of Patent: Jul. 31, 2012

(54) SYSTEM AND METHOD FOR PROCESSING AN UPLOAD OF A PROGRAM WITH EXPORT COMPLIANCE INFORMATION

(75) Inventors: Ricardo Cortes, Los Gatos, CA (US); Max Muller, III, San Jose, CA (US); Jeffrey A. Clites, San Jose, CA (US); Jonathan B. Leffert, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 894 days.

(21) Appl. No.: 12/171,235

(22) Filed: Jul. 10, 2008

(65) Prior Publication Data

US 2010/0011415 A1 Jan. 14, 2010

(51) Int. Cl.
*G06F 7/04* (2006.01)
(52) U.S. Cl. .................................. 726/4; 726/1
(58) Field of Classification Search .................. 726/4, 1, 726/25–26; 713/153
See application file for complete search history.

(56) References Cited

U.S. PATENT DOCUMENTS

| | | | |
|---|---|---|---|
| 2005/0033652 A1* | 2/2005 | Brentano et al. | 705/26 |
| 2005/0154904 A1* | 7/2005 | Perepa et al. | 713/193 |
| 2007/0240223 A1* | 10/2007 | Zpevak et al. | 726/25 |
| 2008/0091677 A1* | 4/2008 | Pedersen et al. | 707/6 |
| 2008/0091938 A1* | 4/2008 | Pedersen et al. | 713/153 |

* cited by examiner

*Primary Examiner* — Samson Lemma
(74) *Attorney, Agent, or Firm* — Novak Druce + Quigg LLP

(57) ABSTRACT

Disclosed herein are systems, methods, and computer readable-media for processing a program with export compliance information, the method including in a process of ingesting a program from a developer to an online store, presenting a request to the developer to indicate if the program contains encryption, upon indication that the program contains encryption, presenting an interface for the developer to upload an appropriate export compliance form, blocking the program from the online store if the appropriate export compliance form is not received, and upon receipt of the appropriate export compliance form, receiving and ingesting the program from the developer into the online store. In one aspect, the method further presents an interface to the developer to upload one export compliance form associated with multiple programs. In another aspect, the export compliance form is bundled with the program for distribution in the online store. The method can include blocking the program from the online store if the program does not meet one or more additional requirements. In one aspect, the appropriate export compliance form is transmitted to a reviewing body for approval before completely ingesting the program. The reviewing body may notify the developer of approval or rejection of the export compliance form.

15 Claims, 10 Drawing Sheets

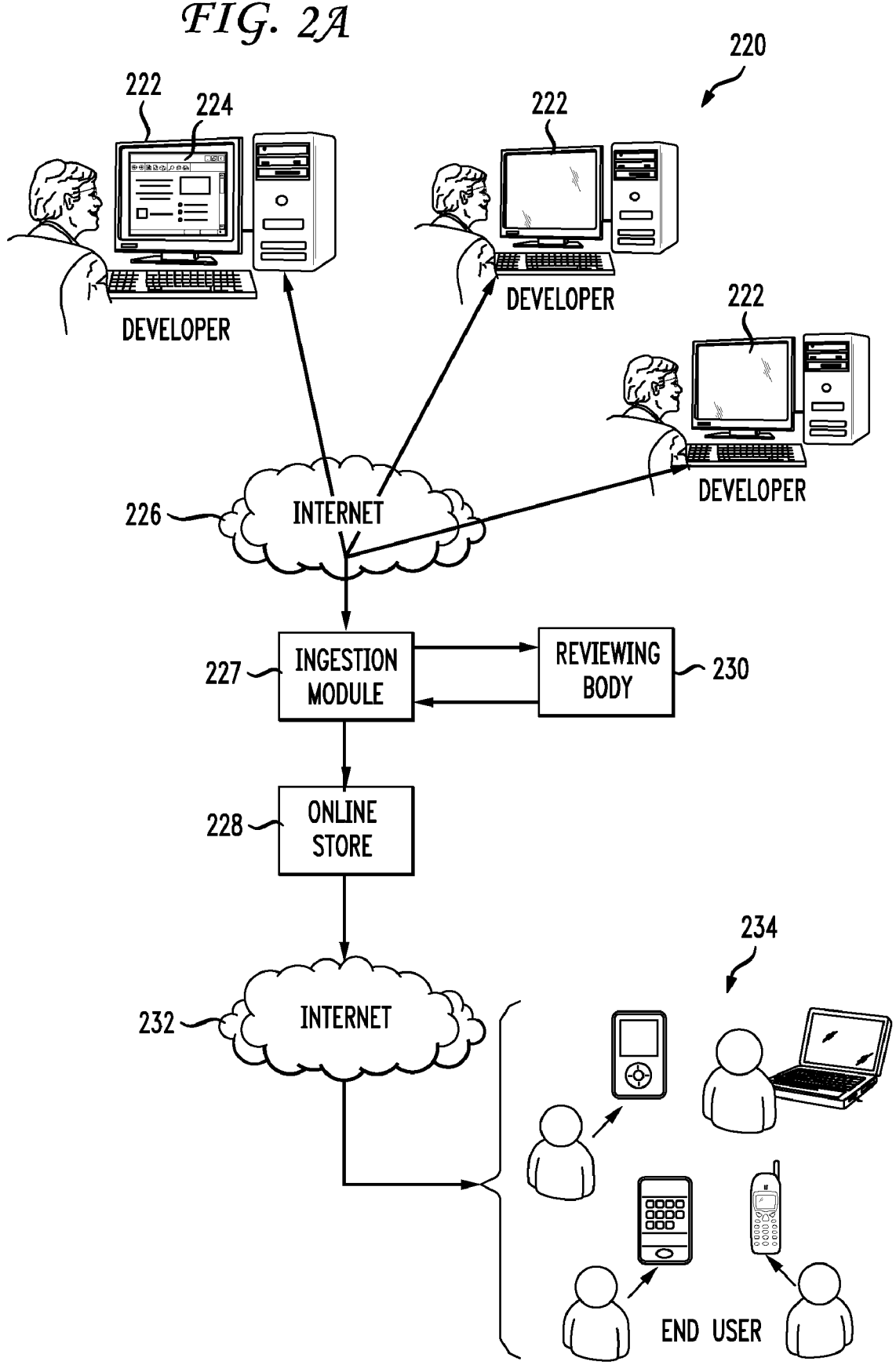

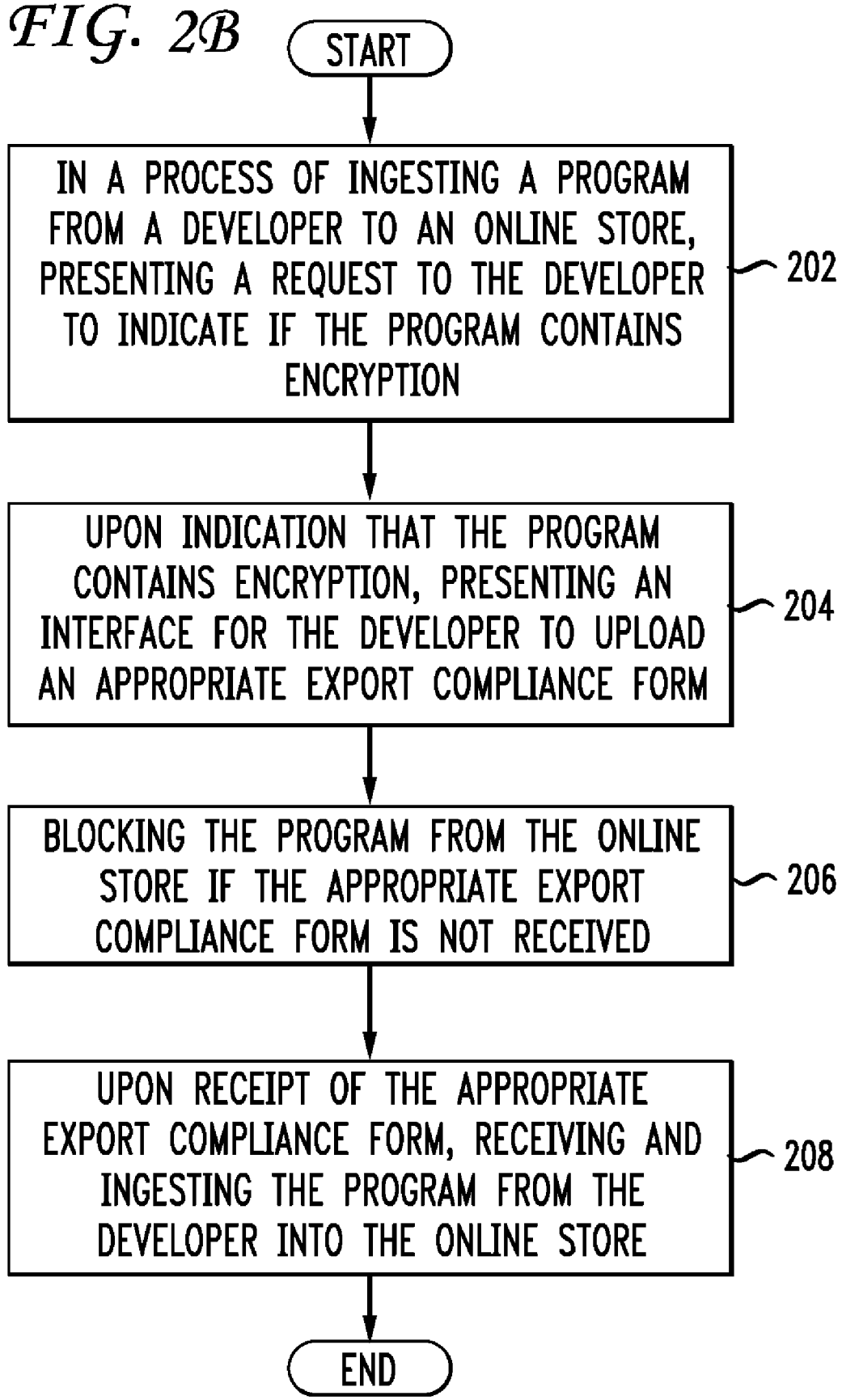

FIG. 5

Export Compliance

Export laws require that products containing encryption be properly authorized for export. Failure to comply could result in severe penalties to the developer and Apple Inc. For further information click here.

Does your product contain encryption?   Yes ● No ○

Encryption Used for Authentication Purpose Only   Yes ○ No ○

Encryption Used for Protection of dates or information Security Purposes   Yes ○ No ○

⟨ Go Back          Continue ⟩

FIG. 7

Export Compliance

Export laws require that products containing encryption be properly authorized for export. Failure to comply could result in severe penalties to the developer and Apple Inc. For further information click here.

| | |
|---|---|
| Does your product contain encryption? | Yes ● No ○ |
| Encryption Used for Authentication Purpose Only | Yes ● No ○ |
| Encryption Used for Protection of dates or information Security Purposes | Yes ● No ○ |

A copy of the commodity classification ruling (CCATS) confirming classification of the Product under ECCN 5D992, as a mass market encryption item under section 742.15(b)(2) of the Export Administration Regulations OR a copy of the "Notification" described in 742.15(b)(1), must be attached in PDF format.

[Choose File]

FormXXX.pdf — 704

[Upload File] — 706

‹Go Back    708 — [Continue›]

*FIG. 8*

802 http://www.onlinestore.com  Q: Google

Downloads | Support | Q: Search

Export Compliance

Export laws require that products containing encryption be properly authorized for export. Failure to comply could result in severe penalties to the developer and Apple Inc. For further information click here.

| | |
|---|---|
| Does your product contain encryption? | Yes ● No ○ |
| Encryption Used for Authentication Purpose Only | Yes ● No ○ |
| Encryption Used for Protection of dates or information Security Purposes | Yes ● No ○ |

A copy of the commodity classification ruling (CCATS) confirming classification of the Product under ECCN 5D992, as a mass market encryption item under section 742.15(b)(2) of the Export Administration Regulations OR a copy of the "Notification" described in 742.15(b)(1), must be attached in PDF format.

[ Choose File ]

FormXXX.pdf ● ─ 804

‹ Go Back                                806 ─ [ Continue › ]

*FIG. 9*

Export Compliance

Export laws require that products containing encryption be properly authorized for export. Failure to comply could result in severe penalties to the developer and Apple Inc. For further information click here.

| | |
|---|---|
| Does your product contain encryption? | Yes ◉ No ○ |
| Encryption Used for Authentication Purpose Only | Yes ◉ No ○ |
| Encryption Used for Protection of dates or information Security Purposes | Yes ◉ No ○ |

A copy of the commodity classification ruling (CCATS) confirming classification of the Product under ECCN 5D992, as a mass market encryption item under section 742.15(b)(2) of the Export Administration Regulations OR a copy of the "Notification" described in 742.15(b)(1), must be attached in PDF format.

[Choose File]

FormXXX.pdf ✓ — 904

‹Go Back           906 — Continue›

SYSTEM AND METHOD FOR PROCESSING AN UPLOAD OF A PROGRAM WITH EXPORT COMPLIANCE INFORMATION

BACKGROUND OF THE INVENTION

1. Field of the Invention

The present invention relates to export compliance and more specifically to streamlined compliance with cryptography export regulations.

2. Introduction

United States law provides controls on export of technology outside the geographical boundaries of the United States for the purposes of encryption. One of the purposes of such regulations is to protect sensitive technology from rogue or terrorist states. An example of such technology is encryption technology with a high degree of protection that can be used for military purposes. A known process involved in obtaining a patent on an invention is receiving approval from the United States Patent Office to send the disclosure to foreign patent offices for processing via an export control license received upon review of the application by the patent office. Another mechanism enables developers to do their own analysis and study the export compliance regulations with regard to encryption in an effort to identify whether an export license is needed. However, these rules are quite complicated and difficult to manage. New software is continuously being developed. In an Internet-connected worldwide market, software may be easily transmitted to servers or locations outside the United States.

Accordingly, what is needed in the art is an improved mechanism to enable a software developer to identify and determine if they are in compliance with governmental export regulations, and if not, to identify what else is needed to comply with applicable export laws and regulations.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Online distribution and sales of software saves developers the time, money, administrative hassles, and risks associated with retail boxed-software distribution. One example is ingestion of software applications into an online store. There is a need for a process to aid in export control and export compliance when selling applications in an online store. In this way, developers in the United States can reach a worldwide market.

Disclosed are systems, methods, and tangible computer readable-media for processing a program with export compliance information, the method including in a process of ingesting a program from a developer to an online store, presenting a request to the developer to indicate if the program contains encryption, upon indication that the program contains encryption, presenting an interface for the developer to upload an appropriate export compliance form, blocking the program from the online store if the appropriate export compliance form is not received, and upon receipt of the appropriate export compliance form, receiving and ingesting the program from the developer into the online store.

In one aspect, the method further presents an interface to the developer to upload one export compliance form associated with multiple programs. In another aspect, the export compliance form is bundled with the program for distribution in the online store. The method can include blocking the program from the online store if the program does not meet one or more additional requirements. In one aspect, the appropriate export compliance form is transmitted to a reviewing body for approval before completely ingesting the program. The reviewing body may notify the developer of approval or rejection of the export compliance form.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 2A illustrates a sample system for an online store including export compliance;

FIG. 2B illustrates an example method embodiment;

FIG. 5 illustrates another sample export compliance encryption dialog screenshot;

FIG. 6 illustrates another sample export compliance form selection dialog screenshot;

FIG. 7 illustrates a sample export compliance form upload dialog screenshot;

FIG. 8 illustrates a sample export compliance form upload indicator screenshot; and FIG. 9 illustrates a sample export compliance success dialog screenshot.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
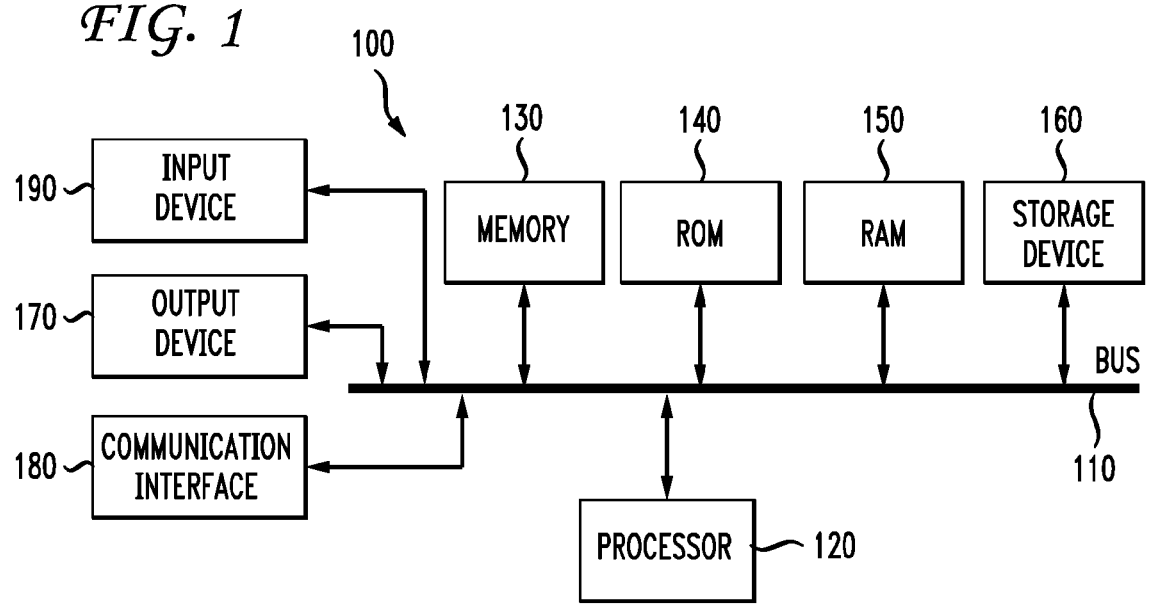
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

FIG. 2A illustrates an exemplary system 220 for an online store including export compliance. Developers 222 use an ingestion interface 224 to upload programs over the Internet 226 to the ingestion module 227 before reaching the online store 228. Developers 222 access the ingestion interface 224 via a computing device including desktop computers, laptops, or servers running any of a variety of operating systems. Any computing device which connects to the Internet can be used. The ingestion interface 224 can be a web page or an Internet-enabled software application installed on the computing device. The ingestion module 227 receives programs from developers and prompts them to provide export compliance forms where applicable. The ingestion module may even supply a link to a government website where a blank export compliance form can be obtained. When appropriate export compliance forms are received, the export compliance form and the associated program are withheld from public access until they are approved by a reviewing body 230. Once approved by the reviewing body, the ingestion module 227 transmits approved programs to the online store 228. The online store 228 makes programs available over the Internet 232 to end users 234 to browse, download, and/or purchase via the online store 228.

FIG. 2B illustrates an example method embodiment for processing a program with export compliance information. First, the method includes presenting a request to the developer to indicate if the program contains encryption in a process of ingesting a program from a developer to an online store (202). The context is an online store that sells or distributes software applications in cooperation with developers. Developers include individual software developers as well as entities such as corporations or non-profit organizations. One generic example of such an implementation is a system run by a software vendor where developers upload software, set a price, and the vendor resells or redistributes the software to end users. One advantage of such an arrangement is that vendors can reach a broad market without maintaining distribution infrastructure and without the hassle of processing individual transactions. Another advantage is that end users can search and purchase/download applications from many developers in a central location. Yet another advantage is that the software vendor can verify and test applications to ensure that applications offered for download are stable, secure, reliable, and operate as advertised. Another advantage is that individual software developers do not need to advertise as heavily if the software vendor takes care of centralized marketing and provide a large marketplace where consumers turn to find and purchase applications.

A program can be received into an online store via an upload form on a web page, an attachment in an email, upload to an FTP server, a link to a binary executable, posting source code or object code, etc. In some cases, delivery of physical media such as floppy discs, optical media, or flash drives can be used to receive a program.

Second, the method includes presenting an interface for the developer to upload an appropriate export compliance form upon indication that the program contains encryption (204). In one aspect, an interface is presented to the developer prompting the developer to upload a plurality of programs or program versions associated with one export compliance form. This is useful where two or more applications contain the same level of encryption according to the export compliance regulations. This saves the developer from repetitively clicking the same options over and over for multiple pieces of software.

Third, the method includes receiving the program from the developer into the online store upon receipt of an uploaded appropriate export compliance form (206). The appropriate export compliance form can be bundled with the program for distribution. The export compliance form can be bundled as metadata, bundled as a text string compiled into the binary, bundled as a link to a website, etc. The export compliance form can be maintained in a central location by the software vendor and made available upon request, such as on an export compliance list on a website.

The appropriate export compliance form can be transmitted to a reviewing body. For instance, the corporation that operates the online store can form a group of experts in export compliance who review each compliance form. The online store operator may do this to limit liability for noncompliant export forms. The reviewing body may be a group of persons, an automatic system, or some combination. The reviewing body can receive notifications of pending export forms one by one (such as by email notifications) or by means of a specialized software application to manage all pending export compliance forms in a standard way. In one aspect, the reviewing body notifies the developer of approval or rejection of the export compliance form. The reviewing body can notify the developer by email, telephone, by posting the export compliance review status on a website, etc.

Fourth, the method includes blocking the program from the online store if the appropriate export compliance form is not received (208). In addition, even if the program meets all the export compliance requirements, the system can block the program if the program does not meet one or more additional requirements. One example of an additional requirement is a maximum application size.

Figure 3:
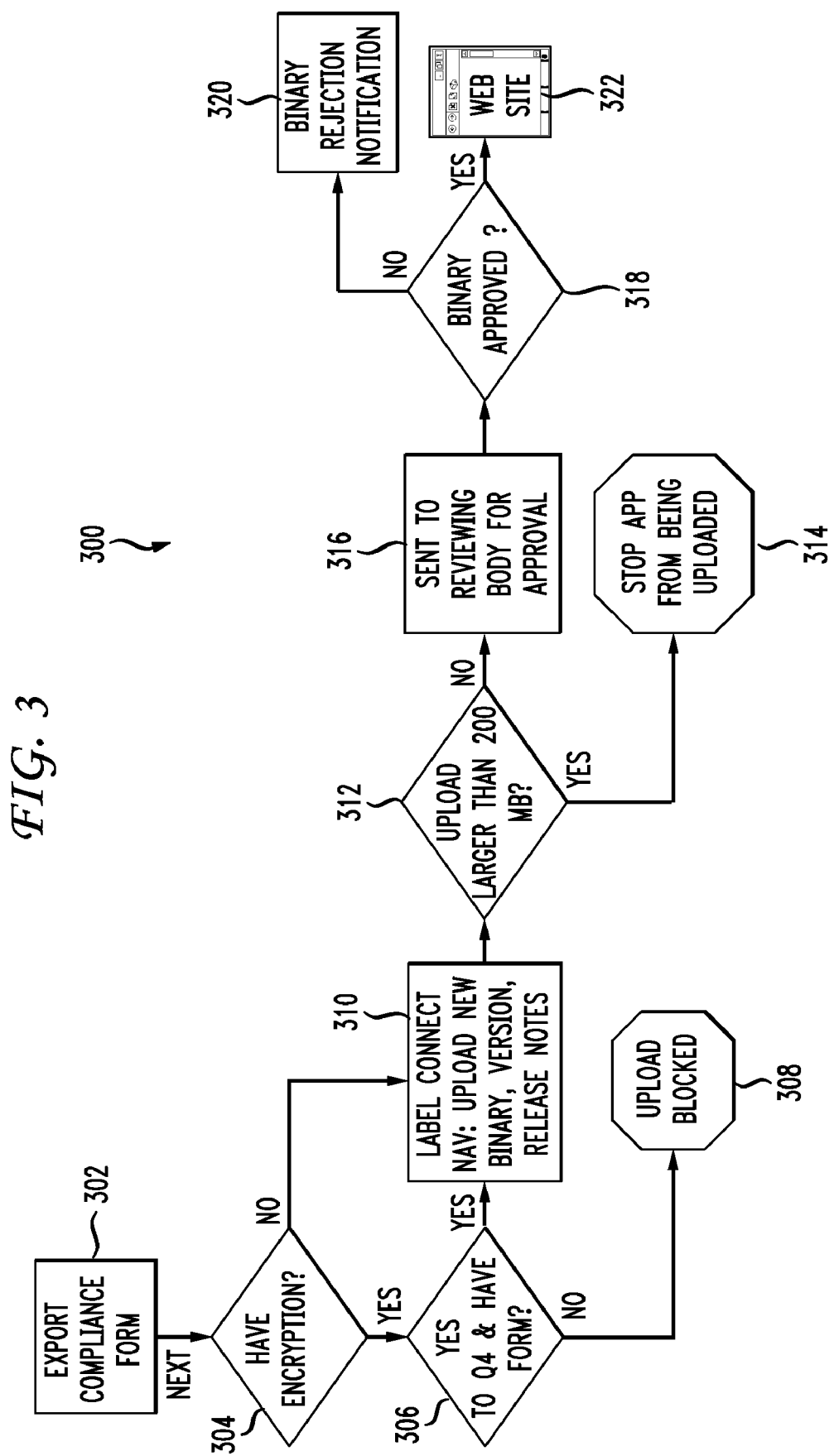
FIG. 3 illustrates an example method flow diagram.

FIG. 3 illustrates an example method flow diagram for ingesting programs into an online store 300. First, the system presents to a developer an Export Compliance Form 302 on a program submission website or in a submission application running on a personal computer. This form is a document requesting information about the export compliance information. The document first asks the developer to indicate whether or not the program in question includes encryption 304. If the developer indicates that the program includes encryption, the developer is further prompted to provide an appropriate export compliance form 306 in Adobe Portable Document Format (PDF) or other standard document format. If the program includes encryption, but the appropriate export compliance form is not provided, the upload is blocked 308. If the program includes encryption and an appropriate export compliance form is provided, the developer is allowed to upload a new binary, version, and release notes 310. Alternatively, if the program does not include encryption, the developer bypasses the step of uploading an export compliance form and is allowed to upload a new binary, version, and release notes 310.

One example, as stated above, of an additional requirement is a maximum size. In this diagram, the system further determines if the uploaded program is larger than 200 megabytes 312. If the upload is larger than 200 megabytes, the system stops the program from being uploaded 314. If the upload is equal to or less than 200 megabytes, the system accepts the uploaded file and sends the file to a reviewing body for approval 316. The reviewing body determines if the binary program is approved 318. If the binary is not approved, the system can send a binary rejection notification 320. If the binary is approved, the system ingests the binary into the online store 322 and makes the binary available on the online store. The program binary can be made available with any relevant export compliance information as a separate package or bundled with the program.

Figure 4:
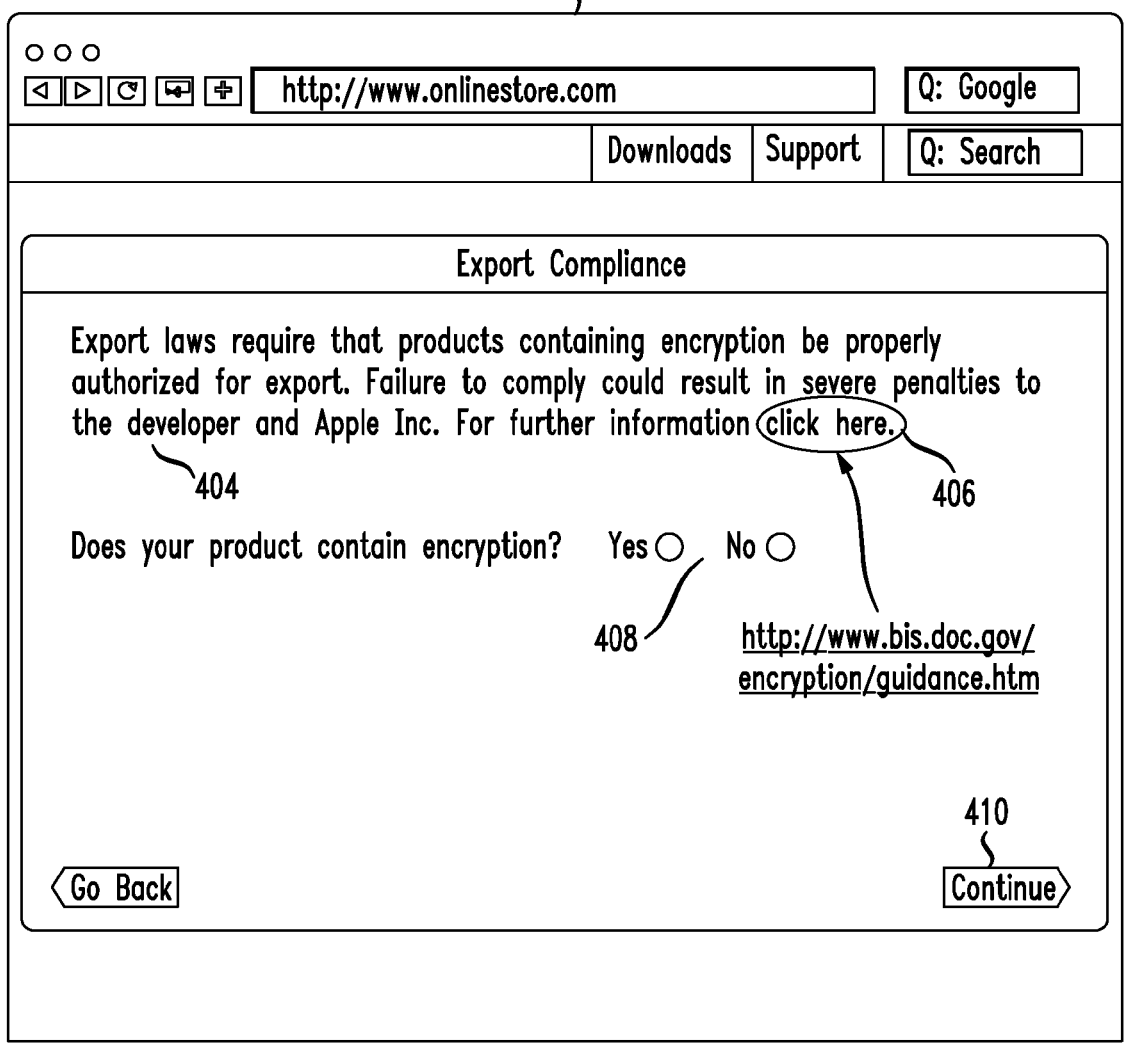
FIG. 4 illustrates a sample export compliance encryption dialog screenshot.

FIGS. 4-9 illustrate a series of screenshots in an exemplary interaction with a developer in the process of uploading a software application as part of ingesting software applications into an online store. As such, the steps and screenshots illustrated and discussed can be integrated as part of a larger program allowing software developers to upload their applications for ingestion in an online store such as Apple's soon-to-be-released App Store or Amazon Software Downloads store. The ingested applications are made available for download for use with computing devices such as personal computers, set-top boxes, smartphones, PDAs, etc. First, FIG. 4 illustrates a sample export compliance encryption dialog screenshot 402 shown to a software developer. An optional statement 404 describing the need for export compliance steps is displayed. A link to a document containing governmental guidelines 406 is displayed. While a link to a government website may be more advantageous, all or part of the actual governmental guidelines document(s) can be included here in place of or as a supplement to the link. A link to the actual government guidelines may be advantageous because changes in the government guidelines are automatically reflected in the linked content. The developer is presented with a question asking if the product contains encryption and two associated radio buttons 408, yes and no. After the developer has made a selection, the developer clicks Continue 410 to proceed to the next screen.

FIG. 5 illustrates another sample export compliance encryption dialog screenshot 502. In this case, the developer indicated that the product contains encryption by selecting the "Yes" radio button 504. The developer is further presented with 2 dialogs asking if encryption is used for authentication purposes only 506 and if encryption is used for protection of data or information security purposes 508. After the developer has made the appropriate selections, the developer clicks Continue 510 to proceed to the next screen.

FIG. 6 illustrates another sample export compliance form selection dialog screenshot 602. In this case, the developer indicated that encryption is used for authentication purposes only and that encryption is used for protection of data or information security purposes by selecting the respective "Yes" radio buttons. At this point, text is displayed requesting that the developer upload a Commodity Classification Automated Tracking (CCAT) form under the applicable section of the Export Administration Regulations 604. A "Choose File" button 606 allows a developer to browse to and select the appropriate form in response to the request. After the developer has made the appropriate selections, the developer clicks Continue 608 to proceed to the next screen.

FIG. 7 illustrates a sample export compliance form upload dialog screenshot 702. In this case, the developer selected a form named FormXXX.pdf 704. The developer is further presented with a button to upload the form 706. After the developer has made the appropriate selections, the developer clicks Continue 708 to proceed to the next screen. Although a PDF file is shown, any type of document may be acceptable. If the form requires a signature, the signature may be obtained in electronic form by printing a physical copy of the document, signing the document, and scanning the document. The signature may also be an electronic signature to obviate the steps of printing and scanning.

FIG. 8 illustrates a sample export compliance form upload indicator screenshot 802. After the user clicks the button to upload the form 706 in FIG. 7, a progress indicator 804 is shown while the form is transmitted. The user clicks Continue 806 to proceed to the next screen, or the user can simply wait for the upload to complete, at which time the dialog moves on.

FIG. 9 illustrates a sample export compliance success dialog screenshot 902. When the form is completely transmitted, a success indicator 904 is displayed to the user. The success indicator can be a check mark, smiley face, approval text, etc. If there was a problem and the form did not transmit properly (i.e. dropped packets, upload was aborted by the user, network connection interrupted, etc.), a failure indicator can be displayed to the user along with a button or dialog to retry uploading the form. The user clicks Continue 906 to proceed past the export compliance section of the interface.

As new versions of an application are developed, encryption can be included or removed. For example, an accounting program that previously had no encryption can add encryption as a feature for sensitive financial records. With each successive version of software, or with each patch, fix, upgrade, update, etc., the online store system can ask the developer to answer export compliance questions again regarding the new version. If a change in export status is indicated, the system evaluates the need for a new export compliance form and requests a new form from the user as needed. An online store which retains copies of export compliance forms can maintain a database of export compliance forms for each version or revision of a software application.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the described principles may have application to compliance with any sort of software export compliance, not merely encryption. Those skilled in the art will readily recognize various modifications and changes that may be made to the present invention without following the example embodiments and applications illustrated and described herein, and without departing from the true spirit and scope of the present invention.

We claim:

1. A method comprising:
    in association with ingesting, in an online shop, a program configured to perform a type of encryption, presenting, via a computer processor, a request to a developer of the program to indicate whether the program contains encryption;
    upon receiving an indication that the program contains encryption, presenting an interface for the developer to upload an appropriate export compliance form;
    blocking by the computer processor the program from the online shop if the appropriate export compliance form is not received;
    upon receipt of the appropriate export compliance form, receiving the program from the developer and transmitting the export compliance form and the program to a reviewing body for approval; and
    upon approval, ingesting the program into the online shop on a per country basis based on the appropriate export compliance form.

2. The method of claim 1, wherein the appropriate export compliance form is associated with multiple programs.

3. The method of claim 1, further comprising bundling the appropriate export compliance form with the program for distribution in the online shop.

4. The method of claim 1, further comprising blocking the program from the online shop if the program does not meet at least one additional requirement.

5. The method of claim 1, wherein the reviewing body notifies the developer of an approval status of the appropriate export compliance form.

6. A system comprising:
    a computer processor; and
    a storage device storing instructions for controlling the computer processor to perform steps comprising:
        presenting a request, to a developer of a program configured to perform a type of encryption to indicate whether the program contains encryption, in association with ingesting the program to an online shop;
        presenting an interface for the developer to upload an appropriate export compliance form upon indication that the program contains encryption;
        blocking the program from the online shop if the appropriate export compliance form is not received;
        receiving the program from the developer and transmitting the export compliance form and the program to a reviewing body for approval; and
        ingesting the program into the online shop on a per country basis based on the appropriate export compliance form, wherein the ingesting is in response to receiving approval from the reviewing body.

7. The system of claim 6, wherein the appropriate export compliance form is associated with multiple programs.

8. The system of claim 6, the instructions further controlling the processor to bundle the appropriate export compliance form with the program for distribution in the online shop.

9. The system of claim 6, the instructions further controlling the processor to block the program from the online shop if the program does not meet at least one additional requirement.

10. The system of claim 6, wherein the reviewing body notifies the developer of an approval status of the appropriate export compliance form.

11. A non-transitory computer-readable storage medium storing a instructions which, when executed by a processor of a computing device, cause the computing device to perform steps comprising:
  in association with ingesting, in an online shop, a program configured to perform a type of encryption, presenting a request to a developer of the program to indicate whether the program contains encryption;
  upon receiving an indication that the program contains encryption, presenting an interface for the developer to upload an appropriate export compliance form;
  blocking the program from the online shop if the appropriate export compliance form is not received; and
  upon receipt of the appropriate export compliance form, receiving the program from the developer and transmitting the export compliance form and the program to a reviewing body for approval; and
  ingesting the program into the online shop on a per country basis based on the appropriate export compliance form, wherein the ingesting is in response to receiving approval from the reviewing body.

12. The non-transitory computer-readable storage medium of claim 11, wherein the appropriate export compliance form is associated with multiple programs.

13. The non-transitory computer-readable storage medium of claim 11, the instructions further comprising bundling the appropriate export compliance form with the program for distribution in the online shop.

14. The non-transitory computer-readable storage medium of claim 11, the instructions further comprising blocking the program from the online shop if the program does not meet at least one additional requirement.

15. The non-transitory computer-readable storage medium of claim 11, wherein the reviewing body notifies the developer of an approval status of the export compliance form.

* * * * *